United States Patent [19]
Sparks et al.

[11] Patent Number: 5,209,058
[45] Date of Patent: May 11, 1993

[54] FUEL CONTROL SYSTEM FOR A GAS TURBINE ENGINE

[75] Inventors: Brian E. Sparks, Shrewley Common; Simon J. Burr, Birmingham, both of England

[73] Assignee: Lucas Industries public limited company of Brueton House, Solihull, England

[21] Appl. No.: 775,563

[22] Filed: Oct. 15, 1991

[30] Foreign Application Priority Data
Oct. 16, 1990 [GB] United Kingdom ............... 9022387

[51] Int. Cl.$^5$ ............................................. F02C 9/28
[52] U.S. Cl. .................................... 60/39.281; 60/734
[58] Field of Search ............................ 60/39.281, 734

[56] References Cited
U.S. PATENT DOCUMENTS

| | | | |
|---|---|---|---|
| 4,300,347 | 11/1981 | Smith ............................ | 60/39.281 |
| 4,760,696 | 8/1988 | Rooks et al. .................... | 60/39.281 |
| 4,817,376 | 4/1989 | Brocard et al. ................. | 60/39.281 |
| 5,086,617 | 2/1992 | Smith ............................ | 60/39.281 |

*Primary Examiner*—Louis J. Casaregola
*Attorney, Agent, or Firm*—Staas & Halsey

[57] ABSTRACT

A gas turbine engine fuel control system includes a metering device responsive to an electrical signal for regulating fuel flow from a pump to the engine, a shut-off valve downstream of the metering device and operable by a first servo pressure, a spill valve operable by a second servo pressure for spilling fuel from upstream of the metering device, an electrically operable valve for controlling the first and second servo pressures, and a circuit for supplying electrical signals to the metering device and the electrically operable valve so that during shut down of the system the spill valve and the shut off valve are maintained respectively open and shut before the metering device shuts.

15 Claims, 3 Drawing Sheets

FUEL CONTROL SYSTEM FOR A GAS TURBINE ENGINE

BACKGROUND OF THE INVENTION

This invention relates to a fuel control system for a gas turbine engine.

It is known, for example from EP-A-0132977 to effect shut-down of a gas turbine engine fuel system by causing substantially all of the fuel delivered by an engine-driven pump to be spilled back to pump inlet. In such a system the spillage of fuel results in a correspondingly rapid loss of system pressure. It is, however, desirable that system pressure, even though reduced, shall be maintained for sufficiently long as to enable servo operated equipment on the engine, as for example the compressor inlet guide vanes, to adopt operating positions appropriate to shut-down. It is also required that after shut-down the engine shall be able to windmill, as herein defined, without undue temperature rise of pumped fuel.

SUMMARY OF THE INVENTION

It is an object of the invention to provide a fuel control system in which these requirements are met.

According to the invention there is provided a fuel control system for a gas turbine engine, comprising a pump, a metering device responsive to an electric control signal for regulating fuel flow from the pump to the engine, a shut-off valve downstream of said metering device and operable by a first servo pressure, a spill valve for spilling fuel from upstream of said metering device, said spill valve being operable by a second servo pressure, an electrically operable valve for controlling said first and second servo pressures, and a circuit for supplying electric signals to said metering device and electrically operable valve so that during shut-down of the system said spill and shut-off valves are respectively open and shut before said metering device shuts.

According to a further aspect of the invention there is provided a fuel control system for a gas turbine engine, comprising a pump, a metering device for regulating fuel flow from the pump to the engine, a servo pressure operable shut-off valve downstream of said metering device, a spill valve responsive to the pressures upstream and downstream of said metering device, for spilling fuel from upstream of said metering device to maintain a pressure difference thereacross substantially constant, a line through which fuel can flow from the downstream side of said metering device to the inlet of said pump, a control valve and a first flow restrictor in series in said line between said downstream side and the pump inlet, the servo pressure for said shut-off valve being taken from between said control valve and said first restrictor, a second flow restrictor between said downstream side and said control valve, the flow resistances of said restrictors being such that, with said metering device and said shut-off valve shut, the leakage flow through said metering device will not result in a pressure rise across said pump greater than 700 kN/m$^2$.

BRIEF DESCRIPTION OF THE DRAWING

An embodiment of the invention will now be described by way of example only and with reference to the accompanying drawings, in which.

DETAILED DESCRIPTION OF THE PREFERRED EMBODIMENTS

Figure 1:
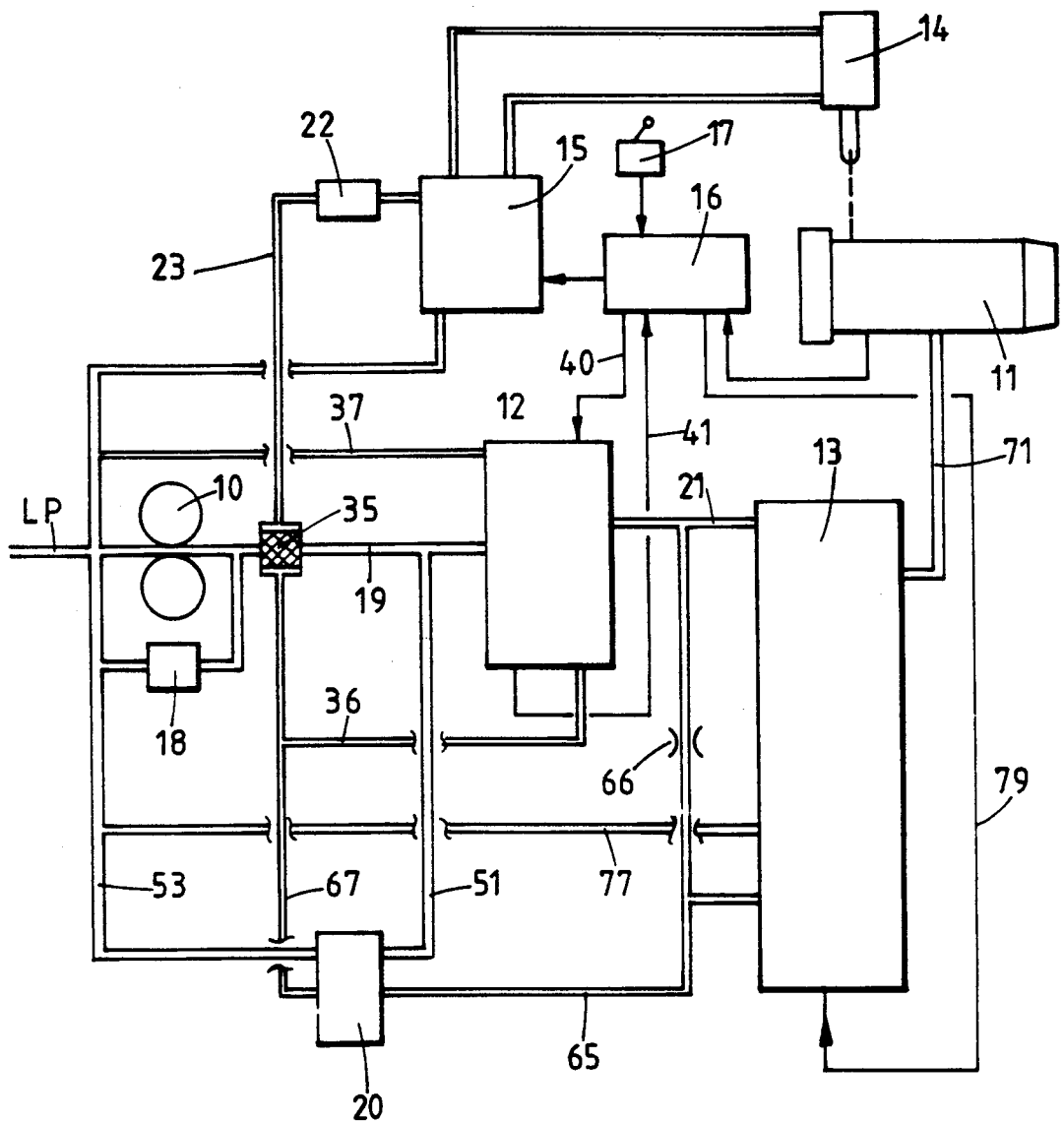
FIG. 1 is a block diagram of a gas turbine engine fuel control system.

As shown in FIG. 1 a positive displacement pump 10 receives fuel at a boost pressure LP and delivers that fuel to a gas turbine engine 11 by way of a variable metering arrangement 12 and a pressure raising and shut-off valve arrangement 13. The pump 10 is driven from a shaft of the engine 11. The geometry of the guide vanes of a compressor of the engine 11 is variable by an actuator 14 to which operating pressure is supplied by way of a control device 15. The metering arrangement 12, the valve arrangement 13 and the device 15 are responsive to signals from a digital control circuit 16, which is in turn responsive to signals from the engine 11, the metering arrangement 12 and an engine speed demand device 17. The device 15 is responsive to the speed of a shaft of the engine 11 and is a known form of electro-hydraulic servo valve which can apply the boost pressure LP and the delivery pressure of the pump 10 selectively to the actuator 14. Transient high flows to the device 15, in the event that the actuator 14 should stick and subsequently release, are prevented by inclusion of a known form of transient-flow limiting valve 22 in the high pressure supply line 23 to the device 15.

In the present example the pump 10 can effect a pressure rise above the boost pressure LP of between 1380 kN/m$^2$ and at least 3450 kN/m$^2$. A spring loaded pressure relief valve 18 is connected between a delivery passage 19 of the pump 10 and the pump inlet. In normal operation of the engine 11 a spill valve 20 is responsive to the pressures in the delivery passage 19 and in an outlet passage 21 from the metering arrangement 12, and can spill fuel from the passage 19 to the pump inlet so as to maintain a difference between the pressures in the passages 19, 21 substantially constant.

Figure 2:
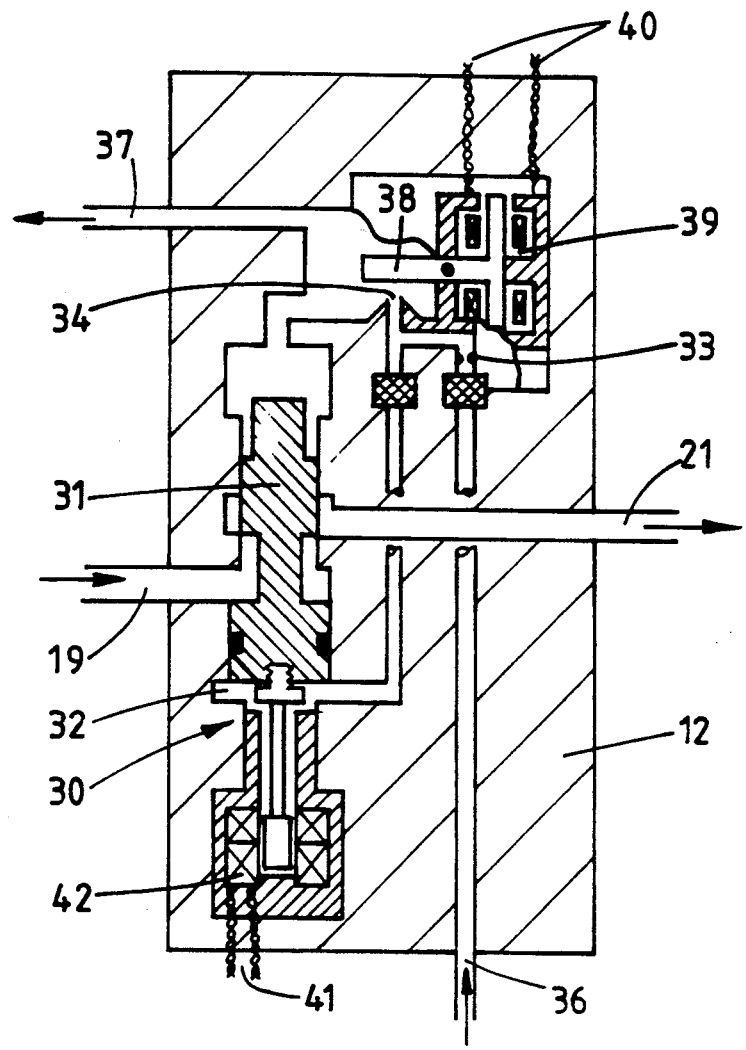
FIG. 2 is a diagram of a metering valve arrangement forming part of FIG. 1.

As shown in FIG. 2 the metering arrangement 12 comprises a metering valve 30 having a control element 31 which is responsive to the pressure in a chamber 32. The pressure in chamber 32 is that intermediate a flow restrictor 33 and a valve 34, which are in series with a filter 35 (FIG. 1), a line 36 and a line 37 between the delivery passage 19 and the inlet of the pump 10. The pump delivery pressure in line 19 and the pressure LP in the line 37 combine to bias the control element 31 against the servo pressure in the chamber 32. The valve 34 includes a control element 38 which is biassed by a spring (not shown) to an open position and which is movable to a shut position by a torque motor 39 which is responsive to signals on lines 40 from the circuit 16. The operating position of the control element 31 is signalled to the circuit 16 on lines 41 by a transducer 42.

Figure 3:
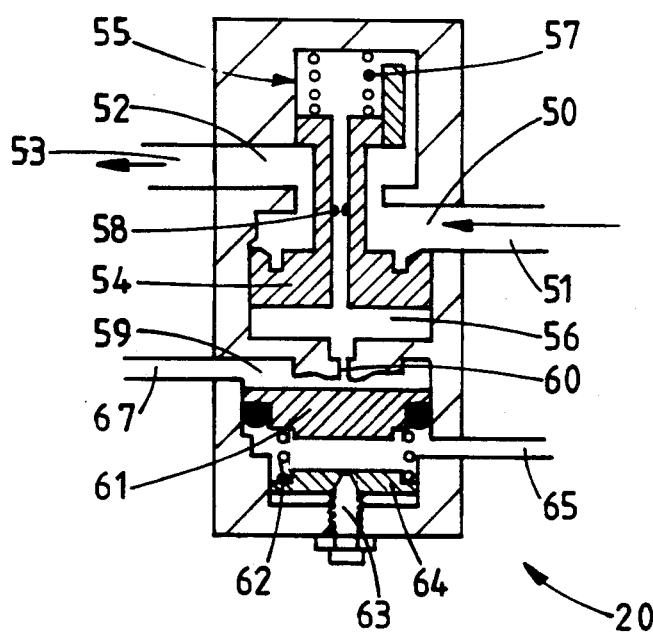
FIG. 3 is a diagram of pressure drop control valve forming part of FIG. 1.

As shown in FIG. 3 the pressure drop control valve, i.e., spill valve 20 has an inlet 50 which communicates through a line 51 with the pump delivery passage 19 (FIG. 1), and an outlet 52 which communicates through a line 53 with the inlet of the pump 10. A flow control element 54 is sealingly slidable in a stepped bore 55 in a housing of the valve 20. The element 54 is responsive to a pressure increase in a chamber 56 to increase flow between the inlet 50 and outlet 52. The element 54 is biassed against the pressure in chamber 56 by a spring 57 and by the pump delivery pressure in inlet 50. The element 54 has an axial through bore which is provided with a flow restrictor 58. A further chamber 59 communicates with the bore 55 by way of an orifice 60. A plunger 61 is slidable in the chamber 59 and is biassed by a spring 62 to shut the orifice 60. The bias applied by the spring 62 is adjustable by means of a screw 63 which acts on a plate 64 on which one end of the spring 62 is located. The plunger 61 can also be urged to restrict flow through the orifice 60 by means of the pressure in the outlet passage 21 (FIG. 1) of the metering arrangement 12 which is applied in normal engine running to one side of the plunger 61 through a line 65 which includes a flow restrictor 66 (FIG. 1). The pressure in the pump delivery passage 19 is applied through the filter 35 and a line 67 to the other side of the plunger 61, and opposes the combined effects of the spring 62 and the pressure in line 65.

In use the plunger 61 opens the orifice 60 when a difference between the pressures in the passage 19 and line 65 exceeds a desired constant value set by the spring 62, whereupon the pressure in chamber 56 rises, moving the control element 54 against the spring 57 to increase spill flow until the metering pressure difference returns to its desired value. A reduction in metering pressure difference correspondingly reduces spill flow to increase the pressure in passage 19 and restores the pressure differences to the desired value. In the present example that value is 483 kN/m$^2$. It should be noted that all pressures, but not pressure differences, given hereafter are to be understood as being values above the pressure LP at the inlet of the pump 10. In normal engine running the pressure in the passage 21 and line 65 is not less than 897 kN/m$^2$. If the pressure in line 65 is caused to fall, in a manner to be described, the pressure in line 67 maintains the orifice 60 open, the pressure in chamber 56 is maintained equal to that in the line 67, and element 54 moves towards its fully open position. Substantially all of the fuel in the passage 19 is then spilled back to the inlet of the pump 10.

Figure 4:
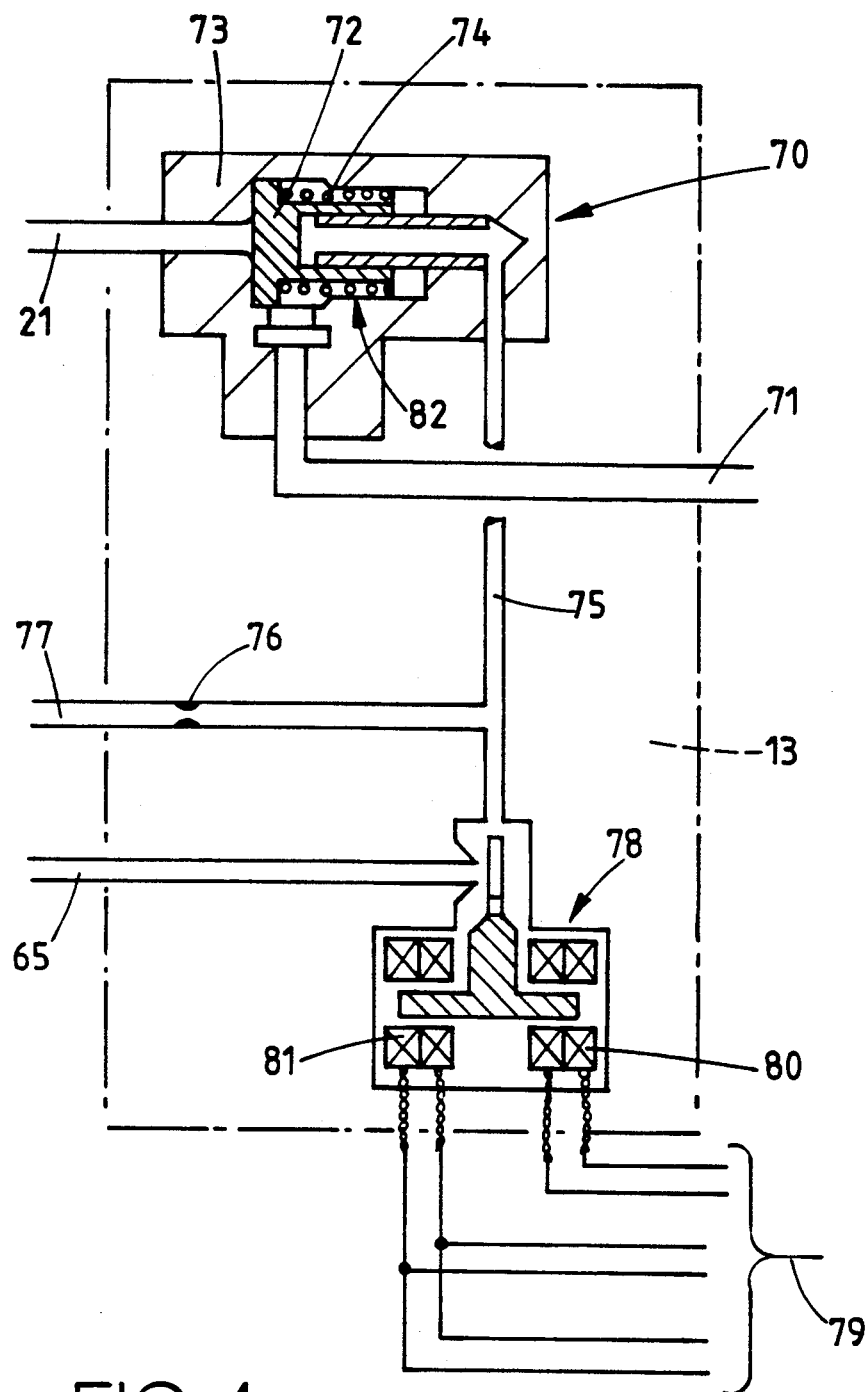
FIG. 4 is a diagram of a combined pressure raising and shut-off valve and a servo pressure control valve therefor.

As shown in FIG. 4 the valve arrangement 13 includes a combined shut-off and pressure raising valve 70 having an inlet communicating with the passage 21 and an outlet communicating by way of a passage 71 with a fuel manifold (not shown) of the engine 11. A flow control element 72 is sealingly slidable in a stepped bore 82 and can engage a seat 73 to shut-off flow through the passage 71. The element 72 is responsive to the pressure in passage 21 and is biassed against that pressure by a spring 74. The element 72 may also be urged by a servo pressure in a line 75 to shut-off flow to the engine 11. The line 75 communicates by way of a flow restrictor 76 and a line 77 with the inlet of the pump 10. The servo pressure in line 75 is derived from the pressure in the passage 65, downstream of the flow restrictor 66 (FIG. 1) by means of a latching solenoid flapper valve 78 whose flow area is large compared to that of the restrictors 66, 76.

During normal engine running the valve 78 is shut in its anticlockwise position, in which condition the pressure in line 75 falls to the pressure LP at the pump inlet. In this condition the valve 70 opens in response to a predetermined level of system pressure in line 21, in the present example at least 897 kN/m$^2$. During start-up the valve 70 thus prevents fuel flow to the engine 11 until the system pressure has reached a level which is sufficient to provide the necessary servo pressures. The throttling action of the valve 70 thereafter maintains the system pressure in line 21, and the sum of the pressure in line 21 and the constant pressure difference across the metering valve 30 determines the pressure rise of 1380 kN/m$^2$ through the pump 10 when fuel is flowing to the engine 11. That pressure rise is adequate for satisfactory operation of the system as whole during normal running of the engine.

The valve 78 is energisable by signals on a group of lines 79 from the circuit 16, and has two sets of windings 80, 81. Windings 80 are energisable from the circuit 16 to open the valve 78 to effect shut-down of the engine 11. Windings 81 are energisable from the circuit 16 to shut the valve 78 during start-up and normal running, or alternatively are energisable in the reverse sense by way of a manually operated switch to effect shut-down. The magnetic circuits of the valve 78 are such that when de-energised it remains in its last operated condition.

When the engine 11 is to be shut down from its running condition the valve 78 is energised open, reducing the pressure in line 65 and opening the valve 20 (FIG. 3) until all fuel, except that occasioned by leakages and required for servo flows, is returned to the inlet of the pump 10.

During run down of the engine following fuel shut off it is necessary to maintain control of the engine compressor vanes, in order to prevent compressor surge. In order to provide a sufficiently high pressure in passage 19 during run down the metering valve 30 is initially maintained partly open, so as to have a large flow area compared to restrictor 66. There is thus fuel flow through the valve 30, and the restrictors 66, 76 during run down. The pressure in passage 21 is applied through restrictor 66, line 65, valve 78 and line 75 to shut the valve 70 such that no leakage occurs through it. No fuel thus flows to the engine 11 and the engine speed drops to a level at which the device 15 causes the compressor guide vanes to move to their minimum speed positions. Fuel also flows from the line 75 through restrictor 76 and line 77 (FIG. 4) to the inlet of the pump 10. The restrictors 66, 76 are such that the pressure in line 75 is maintained at 897 kN/m$^2$ to keep the valve 70 shut. The valve 20 is responsive to the pressure drop of the valve 30 and restrictor 66 in series, most of that pressure drop occurring across the restrictor 66, and being maintained at about 483 kN/m$^2$. The additional pressure drop across restrictor 76 is such as to result in a pump delivery pressure of 1380 kN/m$^2$ in the passage 19, which is sufficient to ensure rapid operation of the actuator 14 and control device 15.

When the compressor guide vanes are detected as having reached their minimum speed positions, typically about 1 second after energisation of the valve 78 to its open position, the circuit 16 de-energises the motor 39 and the valve 34 is urged to a fully open position. The metering valve 30 is thereby moved to its fully shut condition. After the metering valve 30 is shut the valve 20 continues to maintain the required pressure difference of 483 kN/m$^2$ which results from leakage flow through the valve 30, the restrictor 66 and the restrictor 76. It will be understood that if the valve 30 had been fully shut when the valve 78 opened, the pressure in the line 65 would have fallen to just above LP, and the pressure in passage 19 would therefore have been controlled to 483 kN/m$^2$ above LP, which would be insufficient to control the engine compressor vanes.

The amount by which the valve 30 is required to be open during run down of the engine 11, to give the required pressure drop of 483 kN/m² across the valve 30 and the restrictor 66 in series, is dependent inter alia on the flow area of the restrictor 76. That flow area is made sufficiently small that the required pressure drop, and hence the required pressure of 1380 kN/m² in the passage 19, is obtained with a flow through the valve 30 which is insufficient to maintain combustion in the engine 11. Thus, even if the valve 70 were to jam open during shut down, the engine speed would fall sufficiently to cause the compressor guide vanes to move to their minimum speed positions, and thereby to enable valve 30 to be moved fully shut.

If the engine is shut-down while airborne, aerodynamic forces on the engine compressor will continue to rotate the engine shafts, a phenomenon known as windmilling. Since the pump 10 is engine driven it will continue to deliver fuel, but provides a pressure rise which is not greater than 700 kN/m², and is preferably of the order of 517 kN/m². The main metering valve 30 is shut but will permit a small leakage flow. No fuel reaches the engine 10 since the valve 70 is held shut by its spring 74. The valve 78 (FIG. 4) remains open and leakage flow from the metering valve 30 passes by way of the restrictor 66 (FIG. 1) valve 78 and restrictor 76 to the pump inlet. Fuel temperature rise is thereby maintained within an acceptable limit.

During starting of the engine 11 the valve 78 (FIG. 4) is initially maintained open, and the valve 70 is maintained shut by its spring. When an engine speed is reached at which the pump 10 will provide a sufficient pressure to operate the spill and metering valves 20,30, the valve 30 is opened by an amount sufficient to provide light-up flow. The resulting pressure in passage 21 is applied through the restrictor 66 and valve 78 to the valve 70 to maintain the latter shut until the system pressure reaches its required level. Fuel flow through the passage 21, restrictor 66, line 65, valve 78, restrictor 76 and line 77 to the inlet of the pump 10 provides a pressure rise through the pump which is sufficient to operate the actuator 14 and device 15, as described above for engine run down. When the engine reaches light-up speed the valve 78 is energised shut, the pressure in line 65 rises to that in passage 21, and the valve 20 thereafter maintains the required metering pressure difference of 483 kN/m².

If, when engine shut down is demanded, the valve 78 fails to open as a result of defects in the windings 80, or the electrical signals thereto, the windings 81 may be reverse energised by a manual switch, as described above, to effect shut down. The manually operable switch is supplied from an independent power source to ensure shut down can be effected in the event of failure of power supplies to the circuit 16.

In the case of complete failure of the valve 78 to open, shut-down will nevertheless be effected when the main metering valve 30 becomes fully shut at the end of the 1 second delay described above. In these circumstances the valve 70 will not be biassed shut by the servo pressure in line 75 and will act as a pressure raising valve. Since the valve 78 will be shut, leakage past the metering valve 30 will cause the pressure in passage 21 to rise to a value of 897 kN/m², at which the valve 70 lifts open. Flow to the engine 11 will nevertheless be limited to the leakage flow of the metering valve 30. The valve 20 will continue to maintain a metering pressure difference of 483 kN/m², so that the pressure in the passage 19 will become 1380 kN/m². If maintained, the increased flow through the pump 10 in these conditions may, however result in a substantial increase in fuel temperature as a result of windmilling, as above defined.

We claim:

1. A fuel control system for a gas turbine engine, comprising a pump, a metering device responsive to an electric control signal for regulating fuel flow from the pump to the engine, a shut-off valve downstream of said metering device and operable by a first servo pressure, a spill valve for spilling fuel from upstream of said metering device, said spill valve being operable by a second servo pressure, an electrically operable valve for controlling said first and second servo pressures, and a circuit for supplying electric signals to said metering device and said electrically operable valve so that during a first stage of shut-down of the system said shut-off valve is shut and said metering device is at least partially open and during a second stage of shut-down of the system said metering device is shut.

2. A fuel control system as claimed in claim 1 in which said servo pressures are derived from the pressure downstream of said metering device.

3. A fuel control system as claimed in claim 1 which includes first and second flow restrictors connected in series with said electrically operable valve between the downstream side of said metering device and the inlet of said pump, said first servo pressure being derived from that between said electrically operable valve and said first flow restrictor.

4. A fuel control system as claimed in claim 3 in which said second flow restrictor is in series between said downstream side of the metering device and a servo control element for said spill valve.

5. A fuel control system as claimed in claim 3 in which after said spill valve and said shut-off valve are respectively open and shut said metering device is maintained in a reduced flow condition until control devices for airflow in the engine have reached predetermined operating positions.

6. A fuel control system as claimed in claim 5 in which the resistance to flow of said second restrictor is such that, when said shut-off valve is shut and said metering device is in its reduced flow condition, the pressure difference across said second restrictor is greater than that across said metering device as a result of leakage therethrough.

7. A fuel control system as claimed in claim 6 in which the resistance to flow of said first restrictor and said reduced flow condition of the metering device are such that said reduced flow is insufficient to maintain combustion in the engine.

8. A fuel control system for a gas turbine engine, comprising a pump, a metering device for regulating fuel flow from the pump to the engine, a servo pressure operable shut-off valve downstream of said metering device, a spill valve responsive to the pressures upstream and downstream of said metering device, for spilling fuel from upstream of said metering device to maintain a pressure difference thereacross substantially constant, a line through which fuel can flow from the downstream side of said metering device to the inlet of said pump, a control valve and a first flow restrictor in series in said line between said downstream side and the pump inlet, the servo pressure for said shut-off valve being taken from between said control valve and said first restrictor, a second flow restrictor between said downstream side and said control valve, the flow resistances of said restrictors being such that, with said metering device and said shut-off valve shut, a leakage flow through said metering device will be such as to prevent an unacceptable temperature rise in fuel temperature.

9. A fuel control system as claimed in claim 8 in which said leakage flow will not result in a pressure rise greater than 700 kN/m$^2$ across said pump.

10. A fuel control system for a gas turbine engine, comprising a pump, a metering device responsive to an electric control signal for regulating fuel flow from the pump to the engine, a shut-off valve downstream of said metering device and operable by a first servo pressure, a spill valve for spilling fuel from upstream of said metering device, said spill valve being operable by a second servo pressure, an electrically operable valve for controlling said first and second servo pressures, first and second flow restrictors connected in series with said electrically operable valve between the downstream side of said metering device and the inlet of said pump, said first servo pressure being derived from that between said electrically operable valve and said first flow restrictor, and a circuit for supplying electric signals to said metering device and said electrically operable valve so that during shut-down of the system said spill valve and shut-off valve are respectfully open and shut before said metering device shuts.

11. A fuel control system as claimed in claim 10 in which said second flow restrictor is in series between said downstream side of the metering device and a servo control element for said spill valve.

12. A fuel control system as claimed in claim 10 in which, after said spill valve and said shut-off valve are respectively open and shut, said metering device is maintained in a reduced flow condition until control devices for airflow in the engine have reached predetermined operating positions.

13. A fuel control system as claimed in claim 12 in which the resistance to flow of said second restrictor is such that, when said shut-off valve is shut and said metering device is in its reduced flow condition, the pressure difference across said second restrictor is greater than that across said metering device as a result of leakage therethrough.

14. A fuel control system as claimed in claim 13 in which the resistance to flow of said first restrictor and said reduced flow condition of the metering device are such that said reduced flow is insufficient to maintain combustion in the engine.

15. A fuel control system as claimed in claim 10 in which said servo pressures are derived from the pressure downstream of said metering device.

* * * * *